United States Patent [19]

McCaslin et al.

[11] Patent Number: 5,194,855
[45] Date of Patent: Mar. 16, 1993

[54] SECURITY DEVICE

[76] Inventors: Max W. McCaslin, 8640 Medford St., Ventura, Calif. 93004; Tharel E. Morse, 312 Lemar Ave., Oxnard, Calif. 93030

[21] Appl. No.: 681,355

[22] Filed: Apr. 8, 1991

[51] Int. Cl.⁵ ............................................... H04B 1/00
[52] U.S. Cl. ................................. 340/825.31; 70/271; 70/278
[58] Field of Search ........... 340/825.3, 825.31, 825.34, 340/825.56; 361/171, 172, 189; 70/271, 276, 277, 278, DIG. 46; 307/38, 39, 40

[56] References Cited
U.S. PATENT DOCUMENTS
1,905,965 4/1933 Leschke et al. .................... 70/278

Primary Examiner—Donald J. Yusko
Assistant Examiner—Dervis Magistre
Attorney, Agent, or Firm—Robert M. Sperry

[57] ABSTRACT

An improved security system comprising a relay selectably operable to pass electrical power to a protected device, a code plug having a preset combination of possible electrical connections controlling passage of electrical current to actuate said relay, a key carried by an authorized person insertable into said code plug to complete preset combination of connections, and a switch box connected in series between said code plug and said relay having a plurality of multiposition switches each having a plurality of contacts selectably connectable by a person seeking to limit access to said protected device in a manner to define a desired combination to which said switches must be set in order to allow said switch box to pass said current to said relay.

5 Claims, 3 Drawing Sheets

SECURITY DEVICE

BACKGROUND

1. Field of Invention

This invention relates to security devices and is particularly directed to means for preventing unauthorized actuation of electrically-operated devices, such as computers and the like.

2. Prior Art

In today's electronic age, virtually all computers and other office equipment are operated by electricity. This has provided great flexibility and versatility for operating such electrical equipment. Unfortunately, it also makes such equipment highly susceptible to actuation by unauthorized persons. In fact, data piracy and sabotage have become major problems of business world. Numerous devices have been proposed, heretofore, to overcome these problems by providing some type of security system to prevent unauthorized use of these devices. However, most of the prior art security systems have been extremely complex and expensive to purchase and install. Furthermore, many of the prior art security systems have been complicated to use or easy to circumvent. Another disadvantage of prior art security systems has been that many of these systems had encoding means which were fixed or were difficult to recode. Thus, if a breach of security occurred, it was difficult or impossible to change the coding to redefine the list of authorized persons. A search in the United States Patent Office has revealed the following:

| U.S. PAT. NO. | INVENTOR | ISSUED |
|---|---|---|
| 1,353,257 | A. Z. Mample | Sep. 21, 1920 |
| 1,905,965 | H. M. Leschke et al | Apr. 25, 1933 |
| 3,562,596 | J. Scheuer | Feb. 9, 1965 |
| 3,662,342 | R. A. Hedlin et al | May 9, 1972 |
| 3,812,403 | K. W. Gartner | May 21, 1974 |
| 4,267,578 | E. O. Vetter | May 12, 1981 |
| 4,430,728 | J. E. Beitel et al | Feb. 7, 1984 |
| 4,594,637 | S. Falk | Jun. 10, 1986 |
| Re. 17,797 | H. S. Chase et al. | Sep. 16, 1930 |

However, each of these references is subject to the objections set forth above. Thus, none of the prior art security systems have been entirely satisfactory.

BRIEF SUMMARY AND OBJECTS OF INVENTION

These disadvantages of the prior art are overcome with the present invention and an improved security system is provided which is simple and inexpensive to purchase and install, is easy to operate, yet which serves effectively to preclude unauthorized activation of protected equipment.

The advantages of the present invention are preferably attained by providing an improved security system comprising a relay selectably operable to pass electrical power to a protected device, a code plug having a preset combination of possible electrical connections controlling passage of electrical current to actuate said relay, a key carried by an authorized person insertable into said code plug to complete preset combination of connections, and a switch box connected in series between said code plug and said relay having a plurality of multiposition switches each having a plurality of contacts selectably connectable by a person seeking to limit access to said protected device in a manner to define a desired combination to which said switches must be set in order to allow said switch box to pass said current to said relay.

Accordingly, it is an object of the present invention to provide an improved security system.

Another object of the present invention is to provide an improved security system for preventing unauthorized actuation of protected electrical equipment.

An additional object of the present invention is to provide an improved security system for preventing unauthorized actuation of protected electrical equipment which is simple and inexpensive to purchase and install.

A further object of the present invention is to provide an improved security system for preventing unauthorized actuation having a highly flexible encoding means which can be quickly and easily reset when desired.

A specific object of the present invention is to provide an improved security system comprising a relay selectably operable to pass electrical power to a protected device, a code plug having a preset combination of possible electrical connections controlling passage of electrical current to actuate said relay, a key carried by an authorized person insertable into said code plug to complete preset combination of connections, and a switch box connected in series between said code plug and said relay having a plurality of multiposition switches each having a plurality of contacts selectably connectable by a person seeking to limit access to said protected device in a manner to define a desired combination to which said switches must be set in order to allow said switch box to pass said current to said relay.

These and other objects and features of the present invention will be apparent from the following detailed description, taken with reference to the figures of the accompanying drawing.

DETAILED DESCRIPTION OF THE INVENTION

Figure 1:
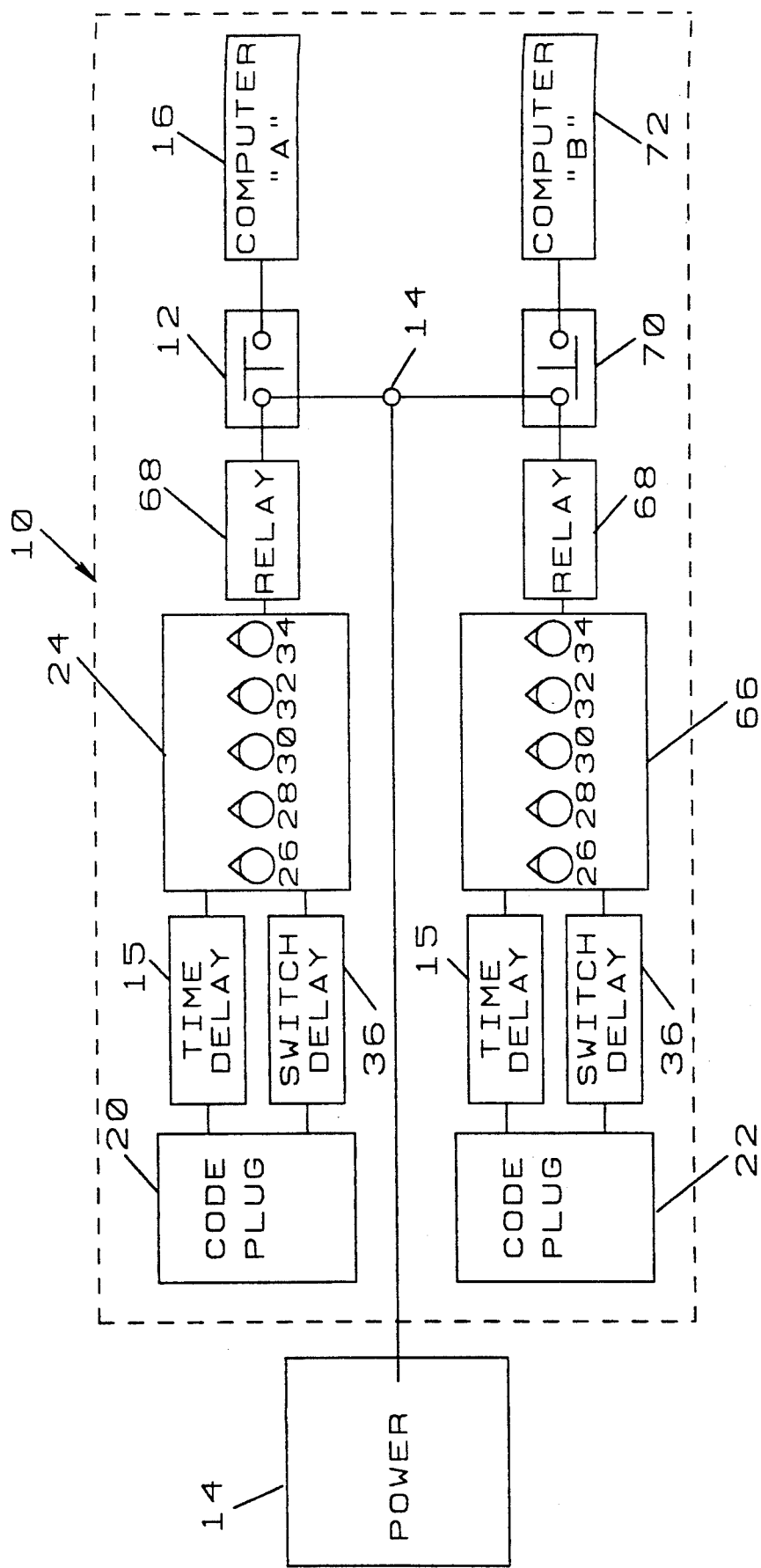
FIG. 1 is a diagrammatic representation of a security system embodying the present invention.

In that form of the present invention chosen for purposes of illustration in the drawing, FIG. 1 shows a security system, indicated generally at 10, controlling the actuation of a switch 12 which regulates passage of electrical power from a suitable source 14 to a device 16, such as a computer or the like, to which access is to be restricted. The switch 12 is actuated by a relay 18 which is controlled by a time delay circuit 15 controlled by the security system 10, which comprises a code plug 20 connected in series with a switch box 24 containing a plurality of multiposition switches 26, 28, 30, 32 and 34. Electrical energy for actuating the relay 18 is supplied by a suitable source 36, which may be a line from power source 14 or may be an independent source, such as a battery or the like. If desired, additional code plugs may be provided connected in parallel with code plug 20, as seen at 22 in FIG. 1.

Figure 2A:
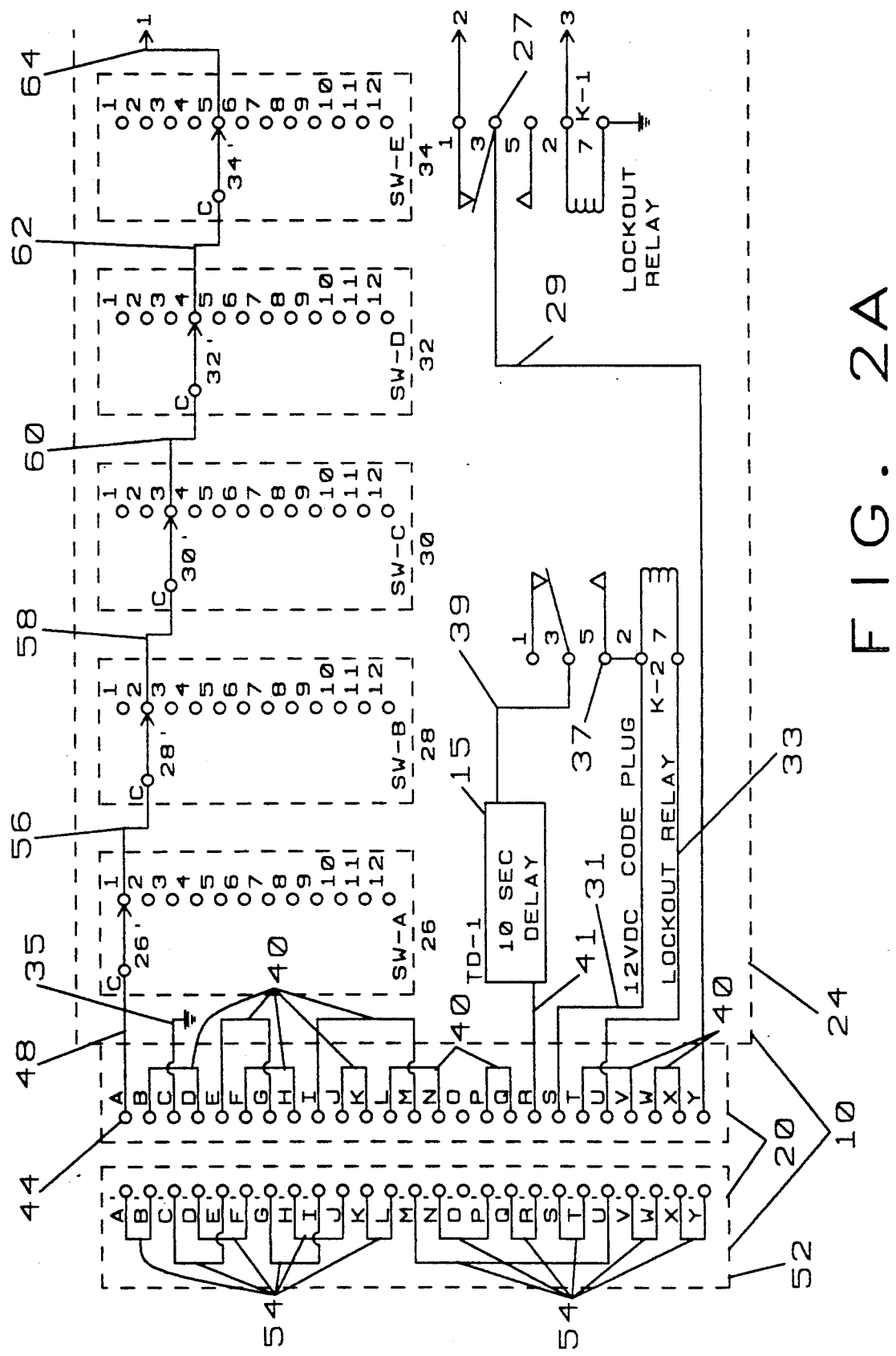
FIG. 2 is a diagrammatic representation showing the connections of the code plug and multiposition switches of the security system of FIG. 1.
Figure 2B:
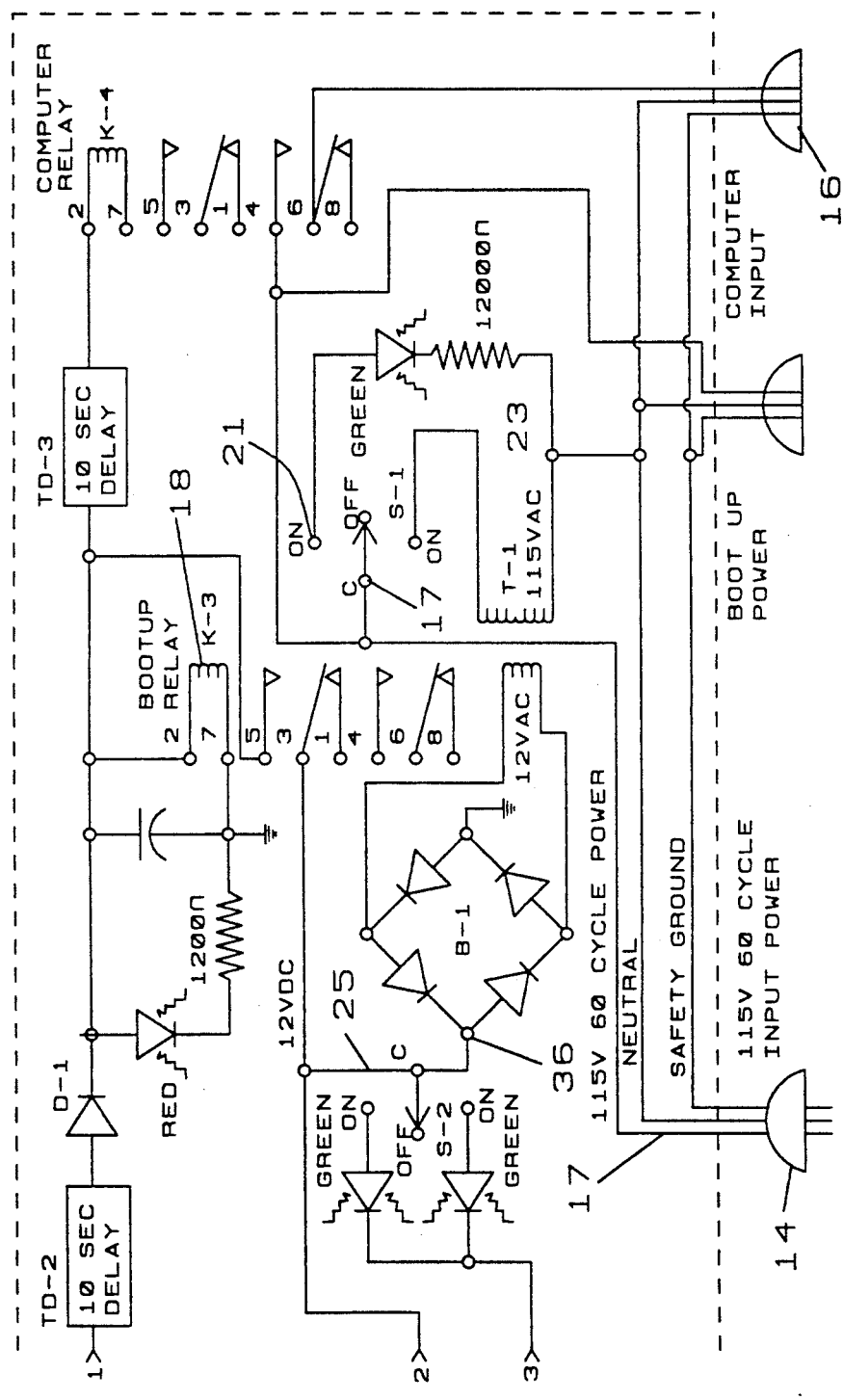

As best seen in FIG. 2, the code plug 20 comprises a base portion 38 containing a plurality of contacts A, B, C, D, E etc. It should be noted that the contacts are not connected together, so there is no conductive circuit path through the base portion 38. For example, contact A is not connected to contact B. However, selected ones of the contacts are interconnected, as by wires 40 to define a predetermined, but incomplete, conductive path through the base portion 38. for example, contacts B and D, E and G, F and H, I and M, etc. are connected together. An output wire 44 connects the output end of the conductive path, for example, from contact A, to the input 48 of switch box 24. It should be noted that selected ones of the contacts of the base portion 38, such as contact O are not connected to any other contact. A second part of the code plug 20 is a key portion 52 containing a plurality of contacts A', B', C' etc. which are mateable with corresponding contacts A, B, C etc. of the base portion 38 and having conductive wires 54 connecting those contacts A', B', C' etc. of the key portion 52 which correspond to the contacts A, B, C etc. of the base portion 38 which are interconnected by the wires 40 to define the predetermined, but incomplete, conductive path through the base portion 38. Thus, it will be seen that a complete conductive path can be traced through the code plug 20.

More specifically, power source 14 supplies 115 volt, 60 cycle, electrical current through wire 17 to the common connection of normally "OFF" switch S-1. When switch S-1 is turned "UP", by moving the switch arm to engage contact 21, the electrical current is allowed to flow through lead 23 to energize transformer T-1, which causes 12 volt alternating current to flow through diode bridge B-1, where the alternating current is rectified and is passed through lead 25 to contact 3 of the bootup relay K-3; to switch S-2 common C, and to contact 1 of lockout relay K-1. If the lockout relay K-1 is NOT energized, the 12 volt direct current is passed through contact 1 of lockout relay K-1 and lead 29 to contact Y of the base portion 38 of the code plug 20. If a proper code key 52 is connected to the base portion 38, contact Y' of the code key 52 will engage contact Y of the base portion 38 and wire 54 will connect contact Y' to contact X' of the code key 52, which engages contact X of the base portion 38 to form a portion of a conductive path through the code plug 20. As shown in FIG. 2, the conductive path through the code plug 20 continues from contact X to contacts W and W'. V' and V, T and T', S' and S. From contact S of base portion 38, the 12 volt direct current is passed through lead 31 to one end of the coil winding lockout relay K-2. The opposite end of the winding of lockout relay K-2 is connected by wire 33 to contact U of the base portion 38 of code plug 20 and, through contact U' of the key portion 52 and contacts M' and M, I and I', G' and G, E and E' and C' and C to ground, as seen at 35. This completes a conductive path through the code plug 20 which allows the 12 volt direct current to energize lockout relay K-2, which then passes the direct current through contact 37 of lockout relay K-2 and wire 39 to time delay circuit 15. After a predetermined interval, for example, ten seconds, time delay circuit 15 passes the direct current through wire 41 to contact R of the base portion 38 of code plug 20. If a proper key portion 52 is connected to the base portion 38, the direct current will be passed through contact R' and contacts Q' and Q, P and P', N' and N, L and L', K' and K, J and J', H' and H, F and F', D' and D, B and B', A' and A to output contact 44 and, hence, through lead 48 of the multiposition switch 24. Time delay circuit 15 provides a predetermined interval in which the multiposition switches 26, 28, 30, 32 and 34 must be properly positioned to complete the electrical circuit to relay 18.

Obviously, if an improper key portion 52 is connected to the base portion 38, the connections in the improper key portion 52 will not mate with the connections of the base portion 38. Thus, the improper key portion 52 will not complete a conductive path through the code plug 20. Only a proper key portion 52 will complete the desired conductive path through the code plug 20.

As indicated above, the base portion 38 of the code plug 20 is connected between the power source 14 and the switch box 24. However, no current can flow through the base portion 38 of the code plug 20 unless the key portion 52 is attached to the base portion 38 to allow the wires 54 of the key portion 52 to complete the conductive path through the code plug 20. Obviously, the base portion 38 of the code plug 20 must be fixed in location, whereas the key portion 52 can be portable and may be carried by an authorized person. If desired, a plurality of identical key portions 52 may be provided, each carried by a respective authorized individual. Thus, for example, all of the members of a particular plant or department who are authorized to use the protected device 16 might carry identical key portions 52. Alternatively, a plurality of code plugs might be connected in parallel, as seen at 20 and 22 in FIG. 1, with each of the code plugs 20 and 22 being either similarly or individually encoded.

After the electrical signal from power source 14 has been passed through the code plug 20, the signal is supplied to switch box 24 for a further security check, provided by the battery of multiposition switches 26, 28, 30, 32 and 34. As best seen in FIG. 2, each of the multiposition switches 26, 28, 30, 32 and 34 comprises a moveable contact, such as a slider or dial, which is selectably engageable with any desired one of a plurality of contacts. Thus, moveable contact 26'C of switch 26 is selectably engageable with any one of its stationary contacts A1, A2, A3, A4, A5, A6, A7, A8, A9, A10, A11 or A12, while moveable contact 28' is selectably engageable with any one of its stationary contacts B1, B2, B3, B4, B5, B6, B7, B8, B9, B10, B11 or B12, etc. Input lead 48 of switch box 24 is connected to moveable contact 26' of multiposition switch 26. However, only a selected one of the contacts of switch 26, for example, contact A1, has a wire 56 connecting to moveable contact 28' of multiposition switch 28. Similarly, only a selected contact, contact B2, of switch 28 is connected by wire 58 to the moveable contact 30' of switch 30; only selected contact C3 of multiposition switch 30 is connected by wire 60 to the moveable contact 32'; only selected contact D4 of switch 32 is connected by wire 62 to moveable contact 34' of switch 34 and only selected contact E5 of switch 34 is connected by wire 64 to time delay relay TD-2. Thus, each of the moveable contacts 26', 28', 30', 32' and 34' must be positioned to engage the selected one of the stationary contacts of the respective one of the multiposition switches 26, 28, 30, 32 and 34 in order to permit passage of electrical current from code plug 20 through the switch box 24 to actuate the relay 18 after a ten second delay. Thus, in order to operate the protected device 16, an authorized person must have the key portion 52 for the appropriate code plug 20 and must know the proper combination of settings for each of the multiposition switches 26, 28, 30, 32 and 34 of the switch box 24.

While code plug 20 and switch box 24 serve to prevent unauthorized operation of the protected device 16, it will be apparent that, if desired, a second switch box 66, substantially identical to switch box 24, may by connected to receive electrical current passed by code plug 20 to regulate passage of the current to a second relay 68, as seen in FIG. 1, to control actuation of switch 70 which serves to pass power from power source 14 to a second protected device 72. With this arrangement, code plug 20 would permit authorized persons to gain access to both protected devices 16 and 72. However, separate combinations could be required for switch boxes 24 and 66. Thus, as suggested above, identical key portions 52 for code plug 20 could be carried by each of the members of a particular department, however, each person would have a respective combination which would be needed to properly set the moveable contacts of their respective switch box 24 or 66 in order to operate their respective protected device 16 or 72. An authorized security person, such as the department manager, would initially set the respective combinations into the switch boxes 24 and 66, by selecting which of the contacts would be connected by the wires 56, 58, 60, 62 and 64 to the moveable contact of the subsequent multiposition switch and to the appropriate relay 18 or 69. Moreover, the department manager or other security person could quickly and easily reset such combinations any time he chose to do so. Thus, if a previously authorized person was to be terminated or the like, the manager could reset the combination for that person's switch box 24 while that person was at lunch and, upon their return, they could no longer gain access to the protected device 16.

Obviously, numerous other variations and modifications can be made without departing from the spirit of the present invention. Therefore, it should be clearly understood that the forms of the present invention described above and shown in the figures of the accompanying drawing are illustrative only and are not intended to limit the scope of the present invention.

What is claimed is:
1. A security system comprising:
an electrically operated device to be protected,
a relay selectably operable to pass electrical power to said protected device,
a code plug having a base portion containing a plurality of pairs of electrical contacts,
a plurality of wires interconnecting selected ones of said contact pairs to define an electrically conductive path through said base portion,
a key portion mateable with said base portion and containing a plurality of conductive means for connecting together the contacts of selected ones of said contact pairs to complete said conductial path,
a switch box connected in series between said base portion of said code plug and said relay containing a plurality of multiposition switches each having a plurality of contacts selectably connectable by a person seeking to limit access to said protected device in a manner to define a desired combination in which said switches must be set to allow said switch box to pass said current to said relay, and
means supplying electrical current to said base portion of said code plug for actuating said relay.
2. The security system of claim 1 further comprising:
a plurality of said key portions each mateable with said base portion.
3. The security system of claim 1 further comprising:
a plurality of electrically operated devices are to be protected;
each of said plurality of devices has a respective relay connected to control passage of power to actuate said device,
a plurality of said switch boxes are provided, each connected in series between said base portion of said code plug and a respective one of said relays and each selectably connected to require a respective combination in which the multiposition switches thereof must be set the respective switch box to pass current to the respective relay.
4. The security system of claim 1 further comprising:
a plurality of code plugs each having the base portion thereof connected in parallel with with the base portions of the other code plugs and each selectably connected to define a respective conductive path, and
a plurality of key portion mateable with respective ones of said base portions to complete the conductive path through the respective base portion.
5. The security system of claim 1 wherein:
said means supplying electrical current to said base portion of said code plug is independent of the means supplying electrical power through said relay to operate said device.

* * * * *